(No Model.) 2 Sheets—Sheet 1.
W. B. LUCE.
PHOTOGRAPHIC SHUTTER.

No. 429,929. Patented June 10, 1890.

WITNESSES:
INVENTOR.

(No Model.) 2 Sheets—Sheet 2.
W. B. LUCE.
PHOTOGRAPHIC SHUTTER.

No. 429,929. Patented June 10, 1890.

WITNESSES.
INVENTOR.

UNITED STATES PATENT OFFICE.

WILLIAM B. LUCE, OF BROOKLINE, ASSIGNOR TO JOHN H. THURSTON, OF BOSTON, MASSACHUSETTS.

PHOTOGRAPHIC SHUTTER.

SPECIFICATION forming part of Letters Patent No. 429,929, dated June 10, 1890.

Application filed November 25, 1889. Serial No. 331,454. (No model.)

*To all whom it may concern:*

Be it known that I, WILLIAM B. LUCE, of Brookline, in the county of Norfolk and State of Massachusetts, have invented certain new and useful Improvements in Photographic Shutters, of which the following is a specification.

This invention has for its object to provide a photographic-lens shutter of simple construction, adapted to be manipulated so as to afford either an instantaneous or a time exposure, as the operator may desire.

The invention consists in a shutter composed of two leaves or members pivoted side by side and provided with springs arranged to throw them across the lens-opening, each shutter member and its spring being capable of independent operation, and a latch or detent adapted to simultaneously hold said members against the pressure of their operating-springs and to release the members successively and permit them to be thrown by their springs, the arrangement being such that a partial movement of the detent will release one member only and permit it to be thrown by its spring to uncover the lens-opening, the other member being held until a further movement of the detent and released thereby, thus enabling a time-exposure to be made, while an uninterrupted movement of the detent will release the two members in quick succession, the interval between the release of the two members being so brief that one follows the other across the lens-opening with sufficient closeness to afford an instantaneous exposure, the member last released covering the lens-opening when thrown by its spring.

The invention also consists in certain details, all of which I will now proceed to describe.

Figure 1:
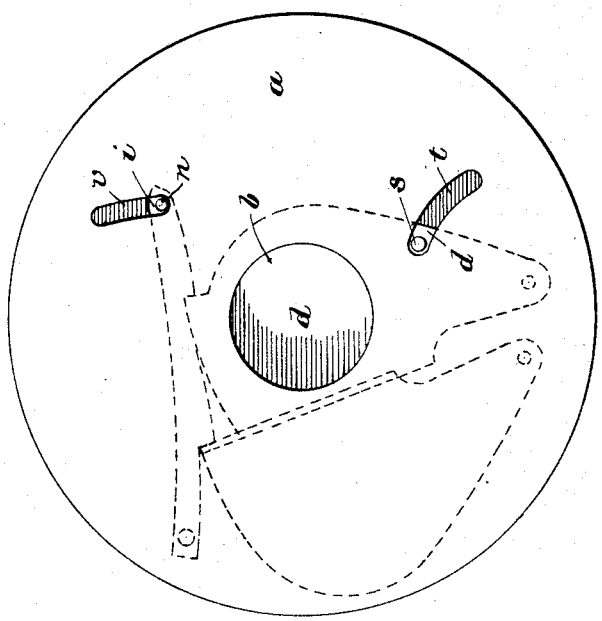
Figure 4:
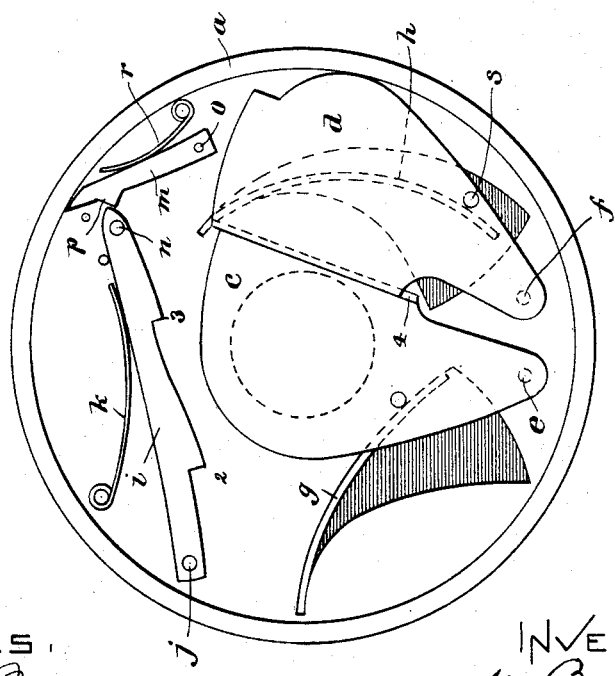
Figure 3:
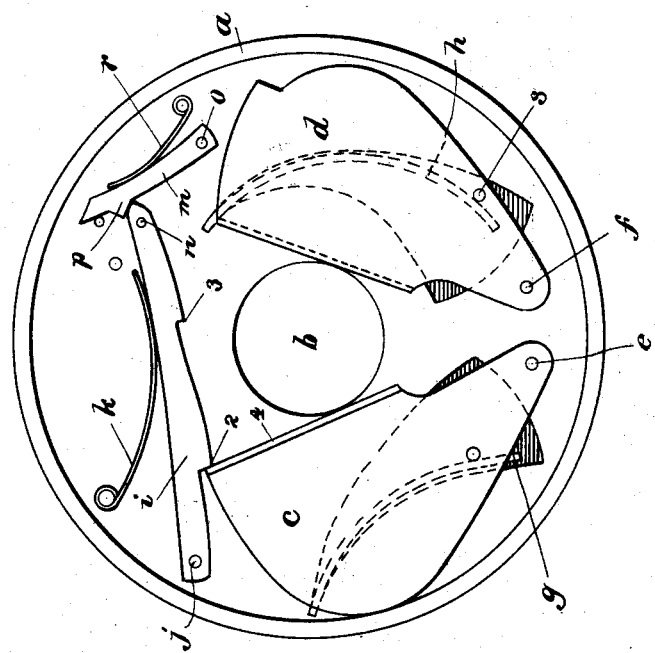
Figure 2:
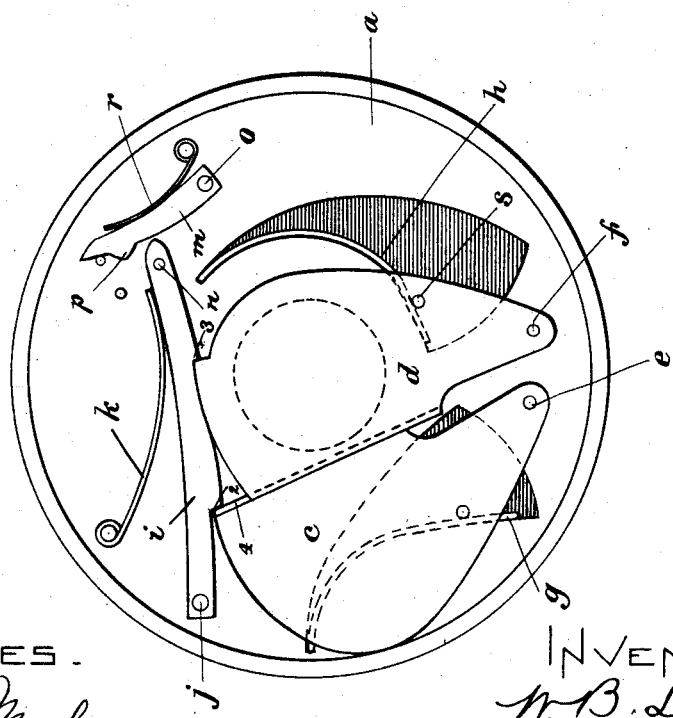

Of the accompanying drawings, forming a part of this specification, Figure 1 represents a front view of my improved shutter. Fig. 2 represents a similar view, one of the side plates of the shutter-casing being removed and the shutter members being shown in the retracted position, in which they are held by the latch or detent. Fig. 3 represents a similar view showing one member released to uncover the lens-opening and the other held by the detent to permit a time-exposure. Fig. 4 represents a similar view showing both members released.

The same letters of reference indicate the same parts in all the figures.

In the drawings, $a$ represents the casing of the shutter, having the central opening $b$, through which light is admitted through the lens to the camera. The manner of applying the shutter to the camera may be similar to that employed in any of the well-known forms of lenses and cameras and need not be here particularly described.

$c$ and $d$ represent the members of the shutter, the same being pivoted, respectively, at $e$ and $f$ to the casing $a$, and provided, respectively, with springs $g$ and $h$, which are secured to the casing $a$ and bear upon studs or projections on the members $c\ d$, said springs being arranged to throw the members $c\ d$ from the position shown in Fig. 2 to that shown in Fig. 4 when the said members are released.

$i$ represents a latch or detent, which is pivoted at $j$ to the casing $a$, and is provided with two shoulders 2 3, the former being arranged to engage the member $c$, while the latter is arranged to engage the member $d$, the latch or detent being thus adapted to hold the said members in the position shown in Fig. 2. A spring $k$ holds the latch in engagement with the members $c\ d$. The arrangement of the latch or detent is such that when it is raised to its fullest extent it releases the members $c\ d$ successively, the shoulder 3 first releasing the member $d$, after which the shoulder 2 releases the member $c$. When the said movement of the latch is continuous or uninterrupted, the members $c\ d$ are released in rapid succession, and although the member $d$ is released first the member $c$ follows it closely, so that the exposure of the opening $b$ is instantaneous, said opening being covered by the member $c$ when the two members have been thrown by their springs to the position shown in Fig. 4. The duration of the instantaneous exposure thus afforded may be determined by the rapidity of the movement of the latch and by the strength of the springs $g\ h$, that impel the members $c\ d$.

If a time-exposure is desired, the operator moves the latch $i$ at first far enough only to release the member $d$, said member being thrown by its spring so as to uncover the opening $b$, the movement of the latch $i$ being insufficient to release the member $c$, so that the latter is held in its retracted position, as shown in Fig. 3. The parts are held in this position until the desired length of exposure has been effected, when by a further movement of the latch $i$ the member $c$ is released and thrown by its spring against the member $d$ and in position to cover the opening $b$. It will be seen, therefore, that by very slight change in the manipulation the operator can effect either a time or an instantaneous exposure, as may be desired.

To guard against a sufficient movement of the latch $i$ to release both members when only one is to be released for a time-exposure, I provide a yielding resistance to the upward movement of the latch $i$, so that the operator may know when he has moved the latch to the position shown in Fig. 3. Said resistance is here shown as a lever $m$, pivoted at $o$ to the casing $a$, and provided with a projection $p$, which is arranged to stand in the path of the swinging end of the latch $i$, so that when the latch has moved outwardly far enough to release the member $d$, but not the member $c$, as shown in Fig. 3, the projection $p$ will bear upon the end of the latch and resist its further movement sufficiently to give the operator the desired warning. A spring $r$ bears upon the lever $m$ and holds the same with a yielding pressure against the latch $i$.

The shutter member $d$ is provided with a stud or handle $s$, which projects through a slot $t$ in one side of the casing $a$, and enables the operator to reset the members $c$ $d$ after they have been thrown by their springs.

The latch is provided with a handle $n$, projecting through a slot $v$ in the casing $a$. Said handle enables the latch to be moved, as described, either directly by the hand of the operator or by pneumatic operating mechanism, such as is now in general use.

I prefer to rabbet or bevel the contacting edges of the members $c$ $d$, so that one will slightly overlap the other and prevent the passage of light through the crevice between the contacting or abutting edges of the plates while the members are being set or moved back to the position shown in Fig. 2. The beveled edge of the member $c$ is shown at 4 in Figs. 2, 3, and 4, the corresponding edge of the other member being correspondingly beveled, as indicated by dotted lines in said figures.

I claim—

1. In a photographic shutter, the combination, with the independently-pivoted spring-impelled shutter members, of the pivoted latch having two shoulders arranged to simultaneously hold and successively release said members, as set forth.

2. In a photographic shutter, the combination, with the independently-pivoted shutter members and their independently-operating springs, of the pivoted latch or detent having two shoulders arranged to simultaneously engage and hold said members, said shoulders being arranged at different distances from the pivot of the latch, whereby when the latch is displaced the said members are released successively, as set forth.

3. In a photographic shutter, the combination, with the independently-pivoted spring-impelled shutter members, of the latch or detent pivoted at one end and provided with two shoulders located at different distances from said pivoted end and formed to engage and simultaneously hold said members, and a yielding resistance or indicator arranged to act on the latch when the latter is being displaced, substantially as and for the purpose specified.

4. In a photographic shutter, the combination, with the independently-pivoted spring-impelled shutter members, of the pivoted latch or detent having two shoulders arranged to simultaneously hold and successively release said members, and the spring-pressed lever having a projection $p$, arranged to act on said latch when the latter is being displaced, as set forth.

In testimony whereof I have signed my name to this specification, in the presence of two subscribing witnesses, this 13th day of November, A. D. 1889.

WILLIAM B. LUCE.

Witnesses:
C. F. BROWN,
KATHERINE E. BROWN.